July 15, 1958 R. J. O'NEILL 2,843,806

CROSS-COOLED CABINET FOR ELECTRICAL EQUIPMENT

Filed April 29, 1955 3 Sheets-Sheet 1

RICHARD J. O'NEILL
INVENTOR.

BY Henry Heyman
ATTORNEY

July 15, 1958 R. J. O'NEILL 2,843,806

CROSS-COOLED CABINET FOR ELECTRICAL EQUIPMENT

Filed April 29, 1955 3 Sheets-Sheet 2

RICHARD J. O'NEILL
INVENTOR.

BY Henry Heyman

ATTORNEY

CROSS-COOLED CABINET FOR ELECTRICAL EQUIPMENT

Filed April 29, 1955 3 Sheets-Sheet 3

RICHARD J. O'NEILL
INVENTOR.

BY Henry Heyman

ATTORNEY

United States Patent Office 2,843,806

Patented July 15, 1958

2,843,806

CROSS-COOLED CABINET FOR ELECTRICAL EQUIPMENT

Richard J. O'Neill, Los Angeles, Calif., assignor to Hughes Aircraft Company, Culver City, Calif., a corporation of Delaware Application April 29, 1955, Serial No. 504,767

2 Claims. (Cl. 317—100)

The present invention relates to cabinets for housing electrical equipment and more particularly to a cabinet providing cross-ventilation for electrical equipment housed therein.

When ever large quantities of electrical components are assembled in a unit of electrical equipment, the removal of heat generated by the components is an important problem. It is an especially pressing problem where several such units, each unit including a relatively large number of high-temperature components, such as electron tubes, are mounted in a closed cabinet.

The problem has been resolved to some extent in the past by mounting the tubes in such a manner that they project from the face of the cabinet so that air can be blown past the tubes to cool them. In this prior art system of cooling, however, the tubes positioned at different levels in the cabinet are successively cooled by the same current of air with the result that the air is continually being warmed by the tubes as it circulates through the cabinet. Accordingly, tubes mounted at different levels are cooled by air of different temperatures and, in consequence thereof, undesirable temperature gradients may exist between the tubes at the different levels. Obviously, this may affect the individual operation of the tubes and, therefore, the over-all operation of the electrical equipment.

Furthermore, the cooling system mentioned above is relatively inefficient for the reason that no specific provision is usually made for moving air past the relatively low-temperature components, such as capacitors and inductors. Although these low-temperature components generate little heat as compared to the heat generated by the high-temperature components, they do contribute to the serious over-all problem of heat removal. The efficiency of this type of system further suffers because, when the cabinet doors are opened or removed, ventilation and, therefore, cooling of the high temperature components, is lost.

It is, therefore, an object of the present invention to provide a cabinet that is functionally designed to provide cross-ventilation for electrical equipment housed therein.

It is another object of the present invention to provide a cabinet that vents fresh air through all levels of the cabinet for uniformly cooling high-temperature electrical components mounted at different levels.

It is a further object of the present invention to provide a cabinet wherein the structural members are utilized as air ducts in such a manner as to provide for the circulation of fresh cooling air at all levels of the cabinet at which high-temperature electrical components are mounted.

It is yet another object of the present invention to provide a cabinet having isolated channels through which air is individually vented for cooling electrical components mounted in the different channels.

It is an additional object of the present invention to provide a cabinet that efficiently conducts away heat generated by both high and low temperature electrical components mounted therein.

It is still another object of the present invention to provide a cabinet that vents air through a network of isolated channels to prevent loss of ventilation when the cabinet doors are opened.

The present invention overcomes the above and other disadvantages of cooling systems found in the prior art by providing a cabinet whose parts are functionally designed to provide cross-ventilation or cross-cooling of electrical components mounted at different levels in the cabinet. According to the basic concept of the present invention, cross-ventilation is obtained by utilizing the cabinet structural members or pillars as air ducts which are connected with the air intake and the air exhaust means of the cabinet. Fresh air is directed at different levels from one air duct to the other by means of tiers stacked between the pillars and in which small chassis boards, holding the electrical components, are plugged.

More particularly, according to an embodiment of the present invention, a plurality of hollow pillars are connected at their ends between a bottom pan and a top pan, the bottom pan having air intake means and a plurality of air outlet orifices, the top pan having a plurality of air intake orifices and air exhaust means. Each pillar has a plurality of openings along its sides and, in addition, is open at one end and closed at the other end, the pillars being positioned, relative to each other, so that the one ends and the other ends are alternately open and closed. Furthermore, the pillars are positioned, relative to the bottom and top pans, in such a manner that the air intake means, some of the air outlet orifices and the pillars connected at their open ends to the bottom pan form a first plurality of air ducts and the air exhaust means, while some of the air intake orifices and the pillars connected at their open ends to the top pan form a second plurality of air ducts.

A plurality of tiers, each tier having isolated channels substantially parallel and perpendicular to the air ducts, are mounted between pillars, the perpendicular channels being aligned with the openings along the sides of adjacent pillars for venting fresh cool air from the first plurality of air ducts to the second plurality of air ducts and the parallel channels being aligned with the other of the air outlet and intake orifices for venting cool air from the bottom pan to the top pan. Chassis boards having first and second passageways in which the electronic components to be cooled are mounted are plugged into the tiers, the first and second passageways aligning with the parallel and perpendicular channels, respectively, whereby the components are cooled by the air flowing through the channels.

A highly desirable feature of the cabinet of the present invention is that it provides a closed cooling system or, stated differently, a network of isolated channels through which fresh air may be separately moved. One advantage of such a system is that it permits different fresh cool air to be moved through each channel in which high-temperature components are mounted. As a result, the components, such as the electron tubes previously mentioned, are uniformly cooled, thereby ensuring greater operating stability of the tubes as well as of the over-all electrical equipment housed in the cabinet.

Another advantage of such a system is that it also permits air to flow through each channel in which low-temperature components are mounted with the result that the additional heat generated by the low-temperature components is also conducted away. Thus, the cooling system of the present cabinet is more efficient than prior art cooling systems. The efficiency of the present cooling system is further enhanced by the fact that it is a closed system and any opening or removal of the doors to the cabinet will not cause a loss in ventilation and, therefore, in cooling of the components.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Figure 1:
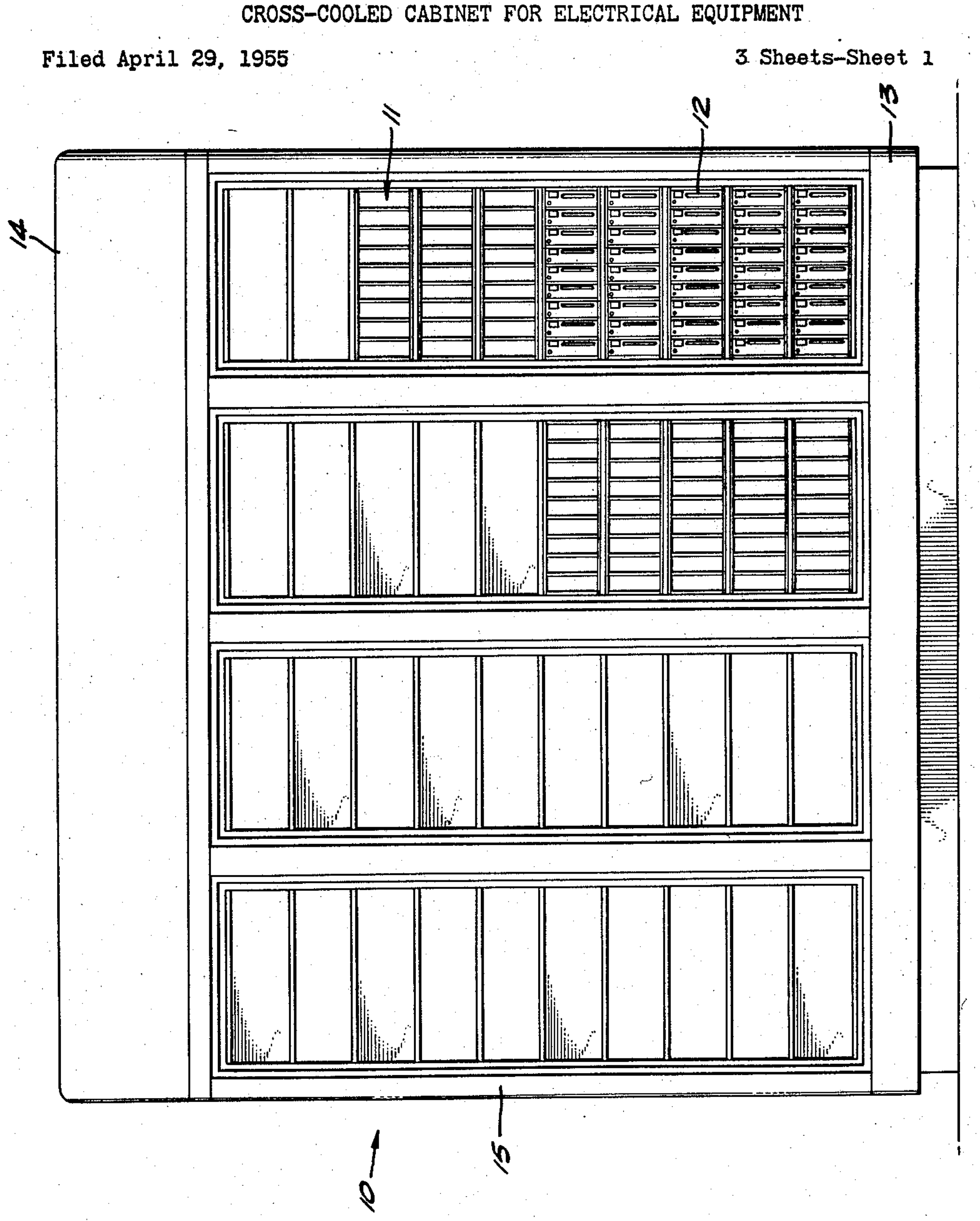
Fig. 1 is a front elevational view of the cabinet and the chassis boards mounted therein according to the present invention.

Referring now to the drawings, there is shown in Fig. 1 a cabinet, according to the present invention, which provides cross-cooling of electrical equipment housed therein. As shown in the figure, the cabinet basically comprises a frame, generally designated 10, and a plurality of tiers, generally designated 11, mounted on the frame and into which are plugged a plurality of chassis boards, generally designated 12. As will be described more fully below, tiers 11 together with chassis boards 12 combine with frame 10 to form a closed network of isolated channels through which air is vented for cooling electrical components mounted on the chassis boards.

Figures 2, 4:
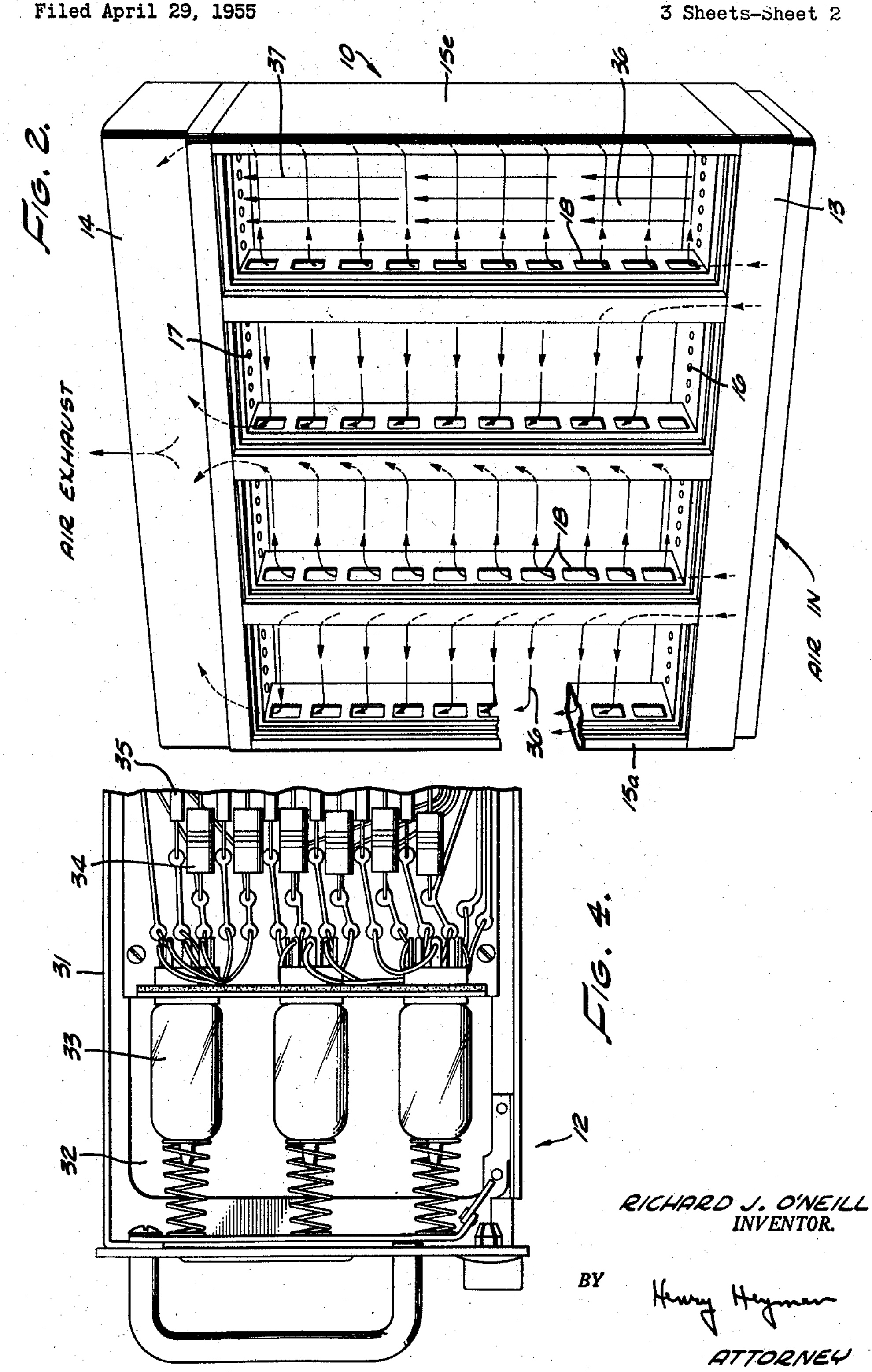
Fig. 2 is a perspective view, partly in section, of the cabinet frame without chassis boards and illustrates air flow through the frame.
Fig. 4 is a side view of a section of a chassis board and the electrical components mounted thereon.

Frame 10 is more clearly shown in Fig. 2 and, as shown therein, essentially comprises a bottom pan 13, a top pan 14, and a plurality of structural members or pillars 15*a*–15*e* rigidly connected between the bottom and top pans for supporting the top pan. Bottom pan 13 is preferably a hollow parallelepiped-shaped base having air intake means (not shown), such as one or more orifices through which air may be admitted to the cabinet, and a plurality of air outlet orifices, such as orifices 16, linearly disposed along the top face of the pan. Similarly, top pan 14 is preferably a hollow parallelepiped-shaped roof structure having air exhaust means (not shown), such as one or more motor driven fans which, by means of suction, force the air from the cabinet, and a plurality of air intake orifices, such as orifice 17, linearly disposed along the bottom face of the pan.

Pillars 15*a*–15*e* are hollow and have openings along the sides thereof, such as opening 18, through which air may be vented. Furthermore, each one of pillars 15*a*–15*e* is open at one end and closed at the other end, the pillars being positioned in such a manner, relative to each other, that the one ends and the other ends are alternately open and closed. Thus, pillars 15*a*, 15*c*, and 15*e* are closed and pillars 15*b* and 15*d* are open at the ends connected to bottom pan 13. On the other hand, pillars 15*a*, 15*c* and 15*e* are open and pillars 15*b* and 15*d* are closed at the ends connected to top pan 14. Still further, pillars 15*a*–15*e* are positioned in such a manner, relative to pans 13 and 14, that the air intake means of bottom pan 13, some of air outlet orifices 16 and pillars 15*a* and 15*b* form a plurality of air input ducts while the air exhaust means of top pan 14, some of air intake orifices 17 and pillars 15*a*, 15*c* and 15*e* form a plurality of air output ducts.

Figure 3:
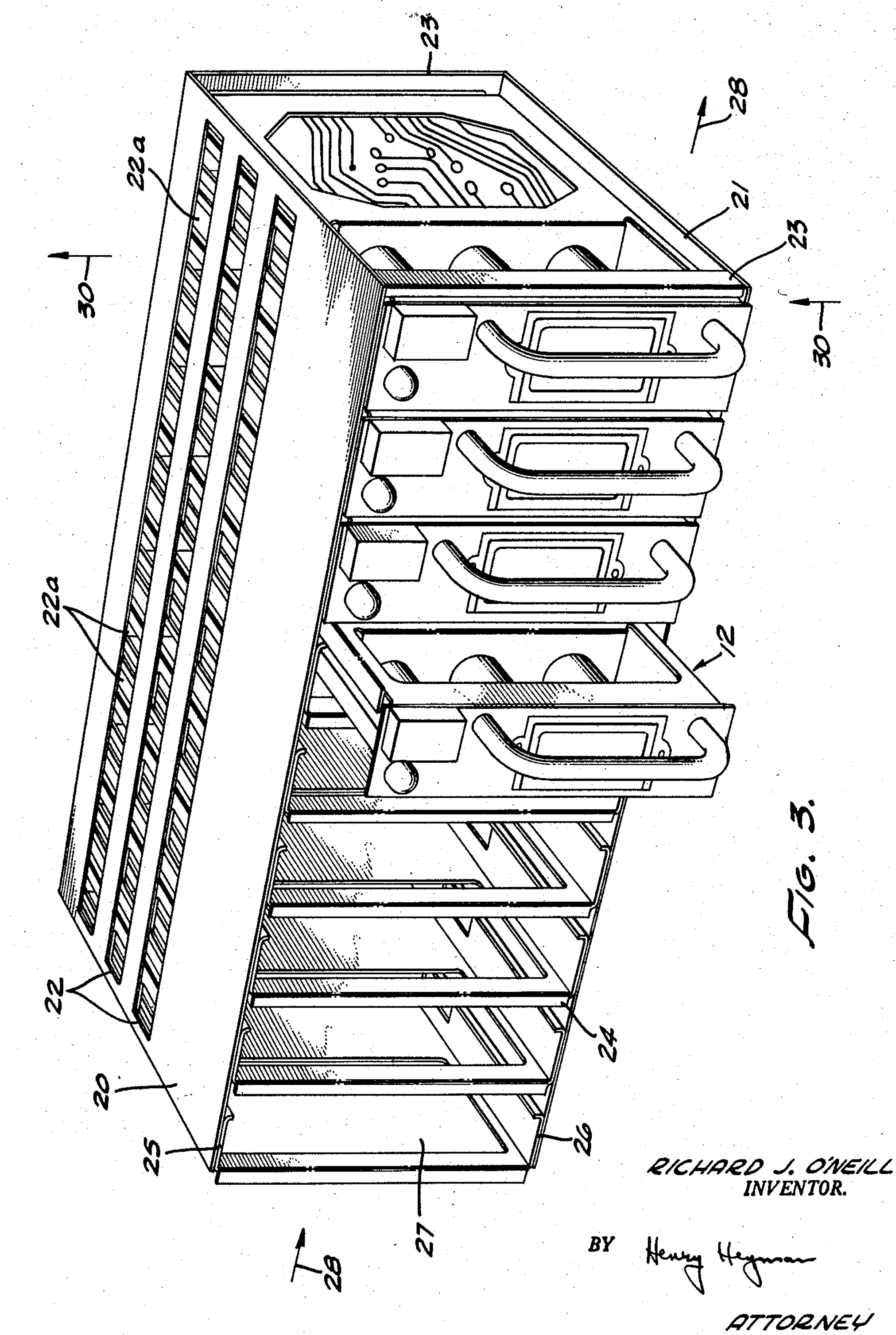
Fig. 3 is a perspective view of a cabinet tier showing several chassis boards either partly or wholly inserted therein.

Tiers 11, one of which is shown in Fig. 3, are basically parallelepiped-shaped mountings for chassis boards 12 and, as previously mentioned, are stacked between channels 15*a*–15*e*. The tier shown in Fig. 3 comprises a pair of rectangular top and bottom or face plates 20 and 21, each face plate preferably having a plurality of identical elongated openings, such as opening 22, cut out from the face plates parallel to the long side of the plates. A plurality of support posts 23 are connected between the face plates 20 and 21 and perpendicular thereto so that plates 20 and 21 and, therefore, openings 22 of the plates, are in alignment. In addition, a plurality of parallel spaced wall plates 24 are positioned between and perpendicular to face plates 20 and 21, each wall plate being connected to the face plates through a pair of tracks 25 and 26 integral with and extending perpendicularly from opposite edges of the wall plates.

Each wall plate 24 has a cutout 27 which is aligned with the cutouts of the other wall plates, thereby forming a passageway or channel, as indicated by arrows 28, that runs parallel to face plates 20 and 21 and perpendicular to wall plates 24. Furthermore, wall plates 24 divide elongated openings 22 into smaller openings of substantially rectangular shape, such as openings 22*a*, openings 22*a* between each pair of adjacent wall plates forming a passageway or channel, as indicated by arrows 30, that runs parallel to wall plates 24 and perpendicular to face plates 20 and 21. Thus, if there are *n* wall plates 24, *n* channels 30 will be formed.

In stacking tiers 11 between pillars 15*a*–15*e*, channels 30 of each tier align with those of every other tier in the stack so that n channels, isolated from each other, are formed which are parallel to the pillars and which extend from the top face of bottom pan 13 to the bottom face of top pan 14. Still further, tiers 11 are stacked in such a manner, relative to pans 13 and 14, that the remaining air outlet orifices 16, channels 30 and the remaining air intake orifices 17 form n ducts through which air may be individually vented by the air intake means of bottom pan 13 and the air exhaust means of top pan 14.

Chassis boards 12 are mounted on or, stated differently, plugged into tiers 11, as previously mentioned, each chassis board being positioned along tracks 25 and 26 between a pair of adjacent wall plates 24. One chassis board is partly shown in Fig. 4 and basically comprises a frame member 31 having a cutout 32 of substantially the same shape as cutouts 27 of wall plates 24 and aligned therewith. A plurality of relatively high-temperature electrical components are mounted in cutout 32, such as spring-mounted electron tubes 33, while a plurality of relatively low-temperature components, such as resistors and capacitors 34 and 35, respectively, are mounted on the remaining solid portion of frame member 31. Thus, components 33 are mounted in channels 28 while components 34 and 35 are mounted in channels 30.

Considering now the operation, when the air exhaust means of top pan 14 is started, a partial vacuum is created in the cabinet. As a result, fresh air is sucked into the cabinet through the air intake means of bottom pan 13.

A portion of this fresh air is vented through the input ducts to the output ducts and, in being so vented, passes through channels 28 of tiers 11, thereby cooling the electrical components mounted in the channels. The air is then further vented through the output ducts and forced out of the cabinet by the air exhaust means. More particularly, a portion of the fresh air sucked into the cabinet enters pillars 15*b* and 15*d* through some of air outlet orifices 16 and, because of the partial vacuum, is forced through openings 18 of these pillars into channels 28 of tiers 11, as indicated by flow lines 36 in Fig. 2. This portion of the air then flows through channels 28 and, by means of openings 18 of pillars 15*a*, 15*c* and 15*e*, into pillars 15*a*, 15*c* and 15*e*. The air is subsequently forced by the air exhaust means through some of air intake orifices 17 and out of the cabinet. Thus, components 33, mounted in channels 28, are cooled by a continuous stream of fresh air.

The remaining portion of fresh air sucked into the cabinet is forced through the remaining air outlet orifices 16 into channels 30 of tiers 11. This portion of air is then vented through channels 30, as indicated by flow lines 37 in Fig. 2, and thereafter forced through the other air intake orifices 17 and out of the cabinet by the air exhaust means. Thus, components 34 and 35, mounted in channels 30, are also cooled by a continuous stream of fresh air.

What is claimed as new is:

1. A cabinet wherein cooling air is caused to flow, via isolated and perpendicular channels, past electrical equipment housed therein, said cabinet comprising: a plurality of parallel spaced hollow pillars having openings along the sides thereof to provide for the passage of air between adjacent pillars, each pillar having one end open and the other end closed, said pillars being positioned in such a manner that the one end of one pillar is adjacent the other end of a succeeding pillar; a bottom pan having air intake means and a plurality of air outlet orifices, said bottom pan being rigidly connected to said pillars in such a manner that said air intake means, some of said air outlet orifices and said open-ended pillars form a first set of air ducts; a top pan having a plurality of air intake orifices and air exhaust means, said top pan being rigidly connected to said pillars in such a manner that said air exhaust means, some of said air intake orifices and said open-ended pillars form a second set of air ducts; and a plurality of tiers mounted between each pair of adjacent pillars and having isolated channels substantially parallel and perpendicular to said first and second sets of air ducts, respectively, said perpendicular channels connecting openings along the sides of adjacent pillars for venting cooling air from said first set of air ducts to said second set of air ducts and said parallel channels connecting the remaining ones of said air outlet orifices with the remaining ones of said air intake orifices for venting cooling air from said bottom pan to said top pan.

2. The combination comprising: a plurality of parallel spaced hollow pillars having openings along the sides thereof to provide for the passage of air between adjacent pillars, each pillar having one end open and the other end closed, said pillars being positioned in such a manner that the one end of one pillar is adjacent the other end of a succeeding pillar; a bottom pan having air intake means and a plurality of air outlet orifices, said bottom pan being rigidly connected to said pillars in such a manner that said air intake means, some of said air outlet orifices and said open-ended pillars form a first set of air ducts; a top pan having a plurality of air intake orifices and air exhaust means, said top pan being rigidly connected to said pillars in such a manner that said air exhaust means, some of said air intake orifices and said open-ended pillars form a second set of air ducts; a plurality of tiers mounted between said pillars and having a first plurality of isolated channels connecting said openings for causing flow of cooling air from said first set of air ducts to said second set of air ducts, said tiers having a second plurality of isolated channels, perpendicular to said first plurality of isolated channels, connecting the remaining ones of said air outlet and intake orifices for moving cooling air from said bottom pan to said top pan; and a plurality of chassis boards having first and second passageways in which are mounted first and second types of electrical components, respectively, said chassis boards being mounted on said tiers in such a manner that said first and second passageways are aligned with said first and second isolated channels, whereby said first and second types of electrical components are separately air-cooled.

References Cited in the file of this patent

UNITED STATES PATENTS

| | | |
|---|---|---|
| 2,169,109 | Muller | Aug. 8, 1939 |
| 2,394,060 | Holmes | Feb. 5, 1946 |
| 2,516,184 | Christie | July 25, 1950 |
| 2,692,961 | Fondiller | Oct. 26, 1954 |

FOREIGN PATENTS

| | | |
|---|---|---|
| 533,251 | Great Britain | Feb. 10, 1941 |
| 879,734 | Germany | June 15, 1953 |